US009072373B2

(12) United States Patent
Hixson (10) Patent No.: US 9,072,373 B2
(45) Date of Patent: Jul. 7, 2015

(54) MODULAR FURNITURE BUILDING BLOCK (71) Applicant: James C Hixson, Fort Myers, FL (US)

(72) Inventor: James C Hixson, Fort Myers, FL (US)

( * ) Notice: Subject to any disclaimer, the term of this patent is extended or adjusted under 35 U.S.C. 154(b) by 93 days.

(21) Appl. No.: 13/786,155

(22) Filed: Mar. 5, 2013

(65) Prior Publication Data
US 2013/0234576 A1 Sep. 12, 2013

Related U.S. Application Data

(60) Provisional application No. 61/611,750, filed on Mar. 16, 2012, provisional application No. 61/607,325, filed on Mar. 6, 2012.

(51) Int. Cl.
| | |
|---|---|
| *A47C 7/00* | (2006.01) |
| *A47B 47/00* | (2006.01) |
| *F16B 12/12* | (2006.01) |
| *A47C 4/02* | (2006.01) |
| *A47C 4/03* | (2006.01) |
| *A47C 13/00* | (2006.01) |

(52) U.S. Cl.
CPC .......... *A47B 47/0091* (2013.01); *A47B 47/0066* (2013.01); *Y10T 29/49826* (2015.01); *A47B 47/0075* (2013.01); *F16B 12/125* (2013.01); *A47C 4/021* (2013.01); *A47C 4/03* (2013.01); *A47C 13/005* (2013.01)

(58) Field of Classification Search
CPC ........... A47B 47/0066; A47B 47/0075; A47B 47/0091; A47C 4/02; A47C 4/03; A47C 13/005

USPC .......... 297/440.1, 440.13, 440.2; 5/12.2, 114, 5/285, 627; 312/108, 257.1, 265.5; 108/56.1
See application file for complete search history.

(56) References Cited

U.S. PATENT DOCUMENTS

| | | | |
|---|---|---|---|
| 2,977,131 A | 3/1961 | Moskovitz et al. | |
| 3,266,134 A | 8/1966 | Moskovitz | |
| 3,351,365 A | 11/1967 | Bickl | |
| 3,601,454 A | 8/1971 | Reinsma | |
| 4,257,207 A * | 3/1981 | Davis ............................ | 52/578 |
| 5,046,791 A * | 9/1991 | Kooiman .................. | 312/265.1 |
| 5,112,110 A * | 5/1992 | Perkins .................... | 297/440.21 |
| 5,291,643 A * | 3/1994 | Boeglin ........................ | 29/283 |
| 5,423,604 A | 6/1995 | Chern | |
| 6,241,317 B1 * | 6/2001 | Wu ......................... | 297/440.23 |
| 7,451,535 B2 * | 11/2008 | Wells et al. ................. | 29/412 |
| 2006/0024128 A1 | 2/2006 | Chiu | |
| 2006/0162066 A1 | 7/2006 | Glattstein et al. | |

* cited by examiner

*Primary Examiner* — Philip Gabler
(74) *Attorney, Agent, or Firm* — Cislo & Thomas, LLP (57) ABSTRACT

A modular furniture building block for providing a modular furniture unit that can be combined with other units to construct or reconstruct any piece of furniture or structure. The modular furniture building block generally includes modular block panels that have a plurality of slots on the surface and/or sides and a plurality of cartridges to connect multiple block panels together at their slots. Multi-port receivers may be attached to the slots and the block panels may be connected by the cartridges via the multi-port receivers.

19 Claims, 7 Drawing Sheets

MODULAR FURNITURE BUILDING BLOCK

CROSS-REFERENCE TO RELATED APPLICATION

This patent application claims the benefit of U.S. Provisional Patent Application Ser. No. 61/611,750, entitled "Multi-Port Receiver Cartridge Joint System," filed Mar. 16, 2012, and U.S. Provisional Patent Application Ser. No. 61/607,325, entitled "Modular Furniture Building Block", filed Mar. 6, 2012, which applications are incorporated in their entirety here by this reference.

TECHNICAL FIELD

This invention relates to furniture systems and more specifically, it relates to a modular furniture building block for providing a modular furniture unit that can be combined with other units to construct or reconstruct any piece of furniture or structure.

BACKGROUND

Furniture can be very expensive. Part of this is because of the amount of tooling required to form the proper connections to create a sturdy piece of furniture. In addition, some furniture may come in pieces and require assembly. Usually, there are numerous fasteners, joints, and the like with unclear instructions for assembly. Also, there is only one correct way of assembling the pieces together. Therefore, if a customer buys a desk, he will assemble a desk. Finally, once assembled, it is very unlikely to disassemble the furniture. This results in an expensive piece of furniture that is difficult to assemble and can be assembled in only one way.

Therefore, there is a need for a modular furniture system that is cheap to manufacture, easy to assemble, and configured for versatility so that a variety of different furniture pieces of various shapes and sizes can be assembled from a single kit.

SUMMARY

The invention generally relates to a furniture system that includes a plurality of modular block panels, each having a series of slots, wherein the block panels can be connected together at the slots via a removable cartridge.

An object is to provide a modular furniture building block for providing a modular furniture unit that can be combined with other units to reconstruct any piece of furniture or structure.

Another object is to provide a modular furniture building block that can be put together to form many different pieces of furniture.

Another object is to provide a modular furniture building block that can provide interchangeable aesthetic options to the furniture pieces.

Another object is to provide a modular furniture building block that eliminates the need for larger single use furniture units.

Another object is to provide a modular furniture building block that is easily moved from place to place.

Another object is to provide a modular furniture building block that is easy to take apart and put together.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1:
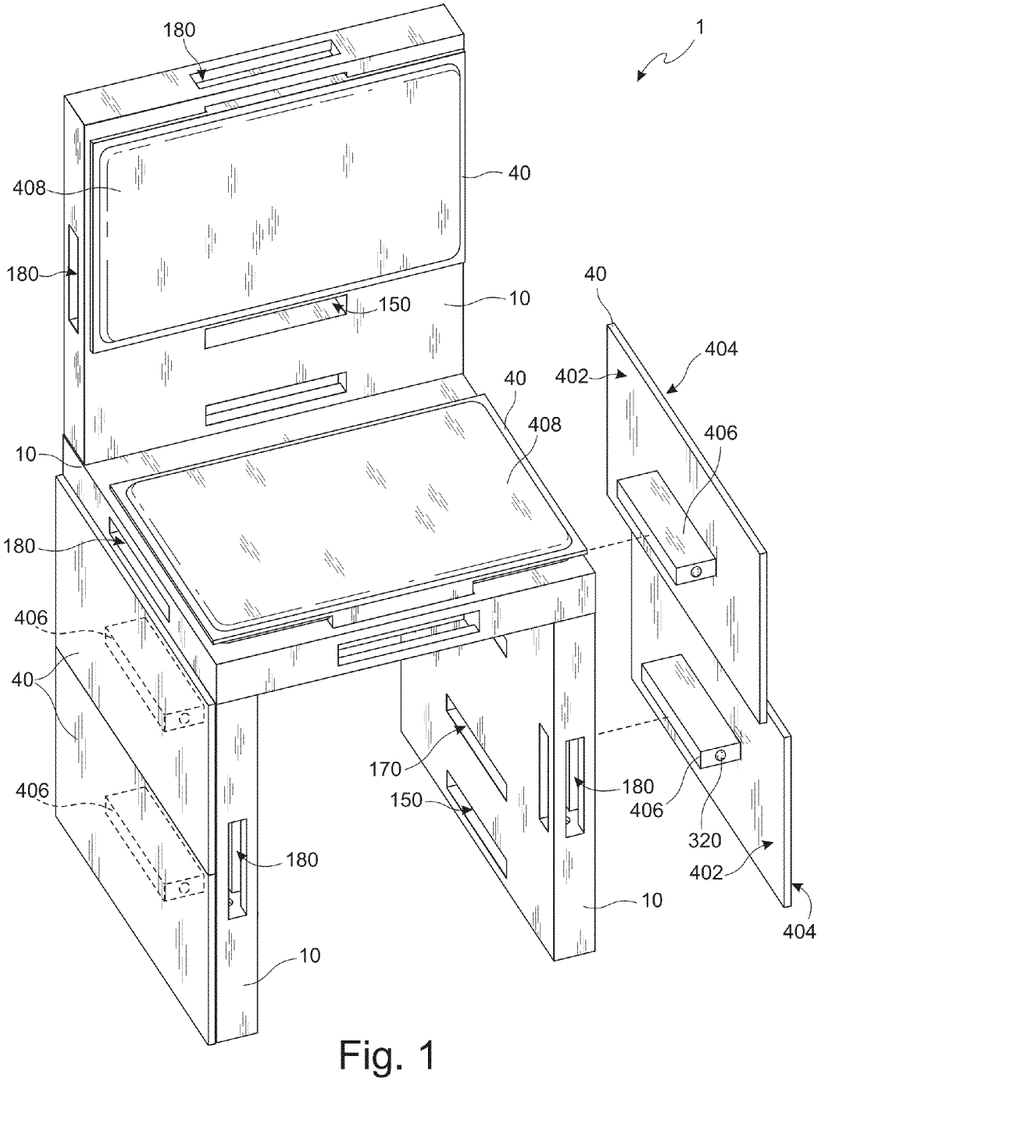
FIG. 1 shows a perspective view of the present invention.
Figure 2:
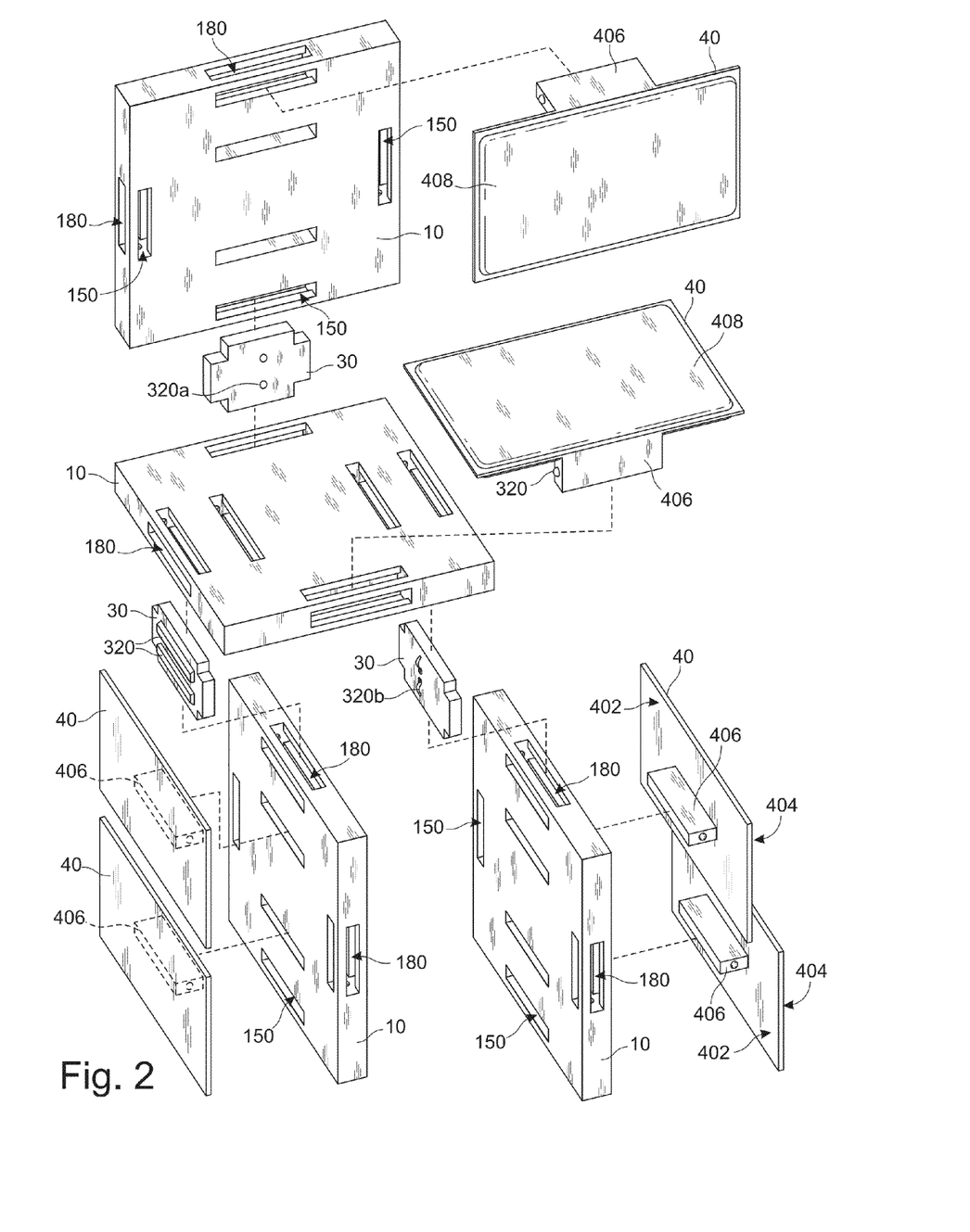
FIG. 2 shows an exploded view of the embodiment shown in FIG. 1.

As shown in FIGS. 1 and 2, the modular furniture 1 comprises at least one modular block panel 10 having a plurality of slots 150, 180 and at least one cartridge 30 configured to fit within any of the slots 150, 180. The cartridges 30 function as joints to connect multiple block panels 10 with each other via the slots 150, 180 to build various types of furniture, such as chairs, tables, desks, shelves, couches, and the like. Being modular due to the plurality of slots 150, 180 and cartridges 30, the furniture 1 can be built to a variety of shapes and sizes. Other accessories can be attached using the block panel 10 and cartridge 30 system. Note, the cartridges 30 shown have different types of connection mechanisms referred to as detents 320. Any of the detents 320, 320a, 320b can be used for any of the cartridges 30 in any combination.

Figure 3:
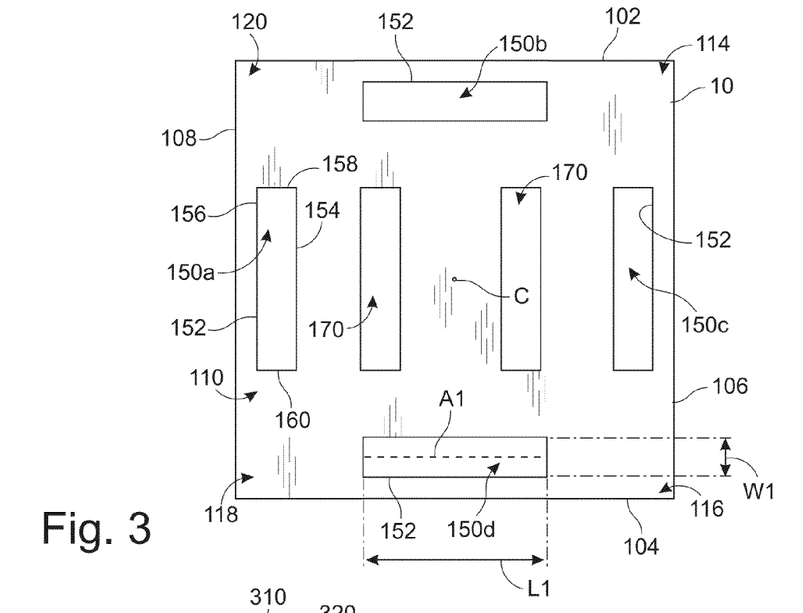
FIG. 3 shows a top view of an embodiment of the block panel.

As shown in FIG. 3, in the preferred embodiment, the modular block panel 10 is generally rectangular in shape having a center C. By definition, rectangular also includes square shaped. Therefore, the block panel 10 has a first panel side 102, a second panel side 104 opposite the first panel side 102, a third panel side 106 adjacent to the first panel side 102 and the second panel side 104, a fourth panel side 108 opposite the third panel side 106 and adjacent to the first panel side 102 and the second panel side 104, a first panel surface 110 bound by the first, second, third, and fourth panel sides 102, 104, 106, 108, and a second panel surface 112 opposite the first panel surface 110, the second panel surface 112 being bound by the first, second, third, and fourth panel sides 102, 104, 106, 108. A plurality of surface slots 150*a-d* are created into the first and/or second panel surfaces 110, 112. The block panel 10 may be a one-piece unit made of a rigid material, such as wood, metal, plastic, and the like, or any combination thereof. In the one-piece embodiment, the block panel 10 may be hollow inside or have hollow portions inside. Other shapes can also be used for the block panels 10. By way of example only, other shapes can include, but are not limited to, L-shapes, H-shapes, hexagons, cubes, circles, and the like.

Figure 5:
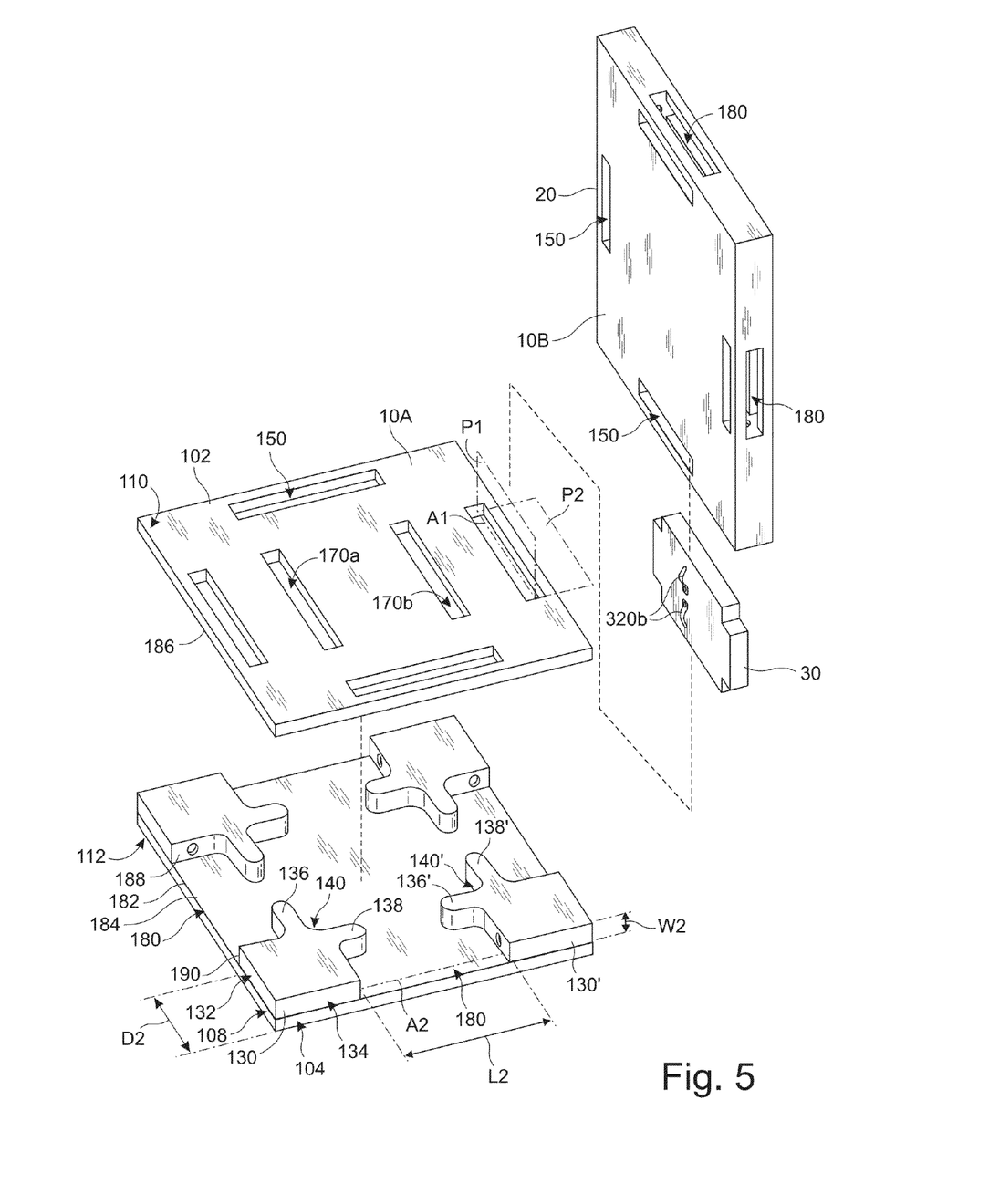
FIG. 5 shows a partial assembly between two block panels.

In some embodiments, the first and second panel surfaces 110, 112 may be made from two separate panels connected together to form a single block panel as shown in FIG. 5. In such an embodiment, the two separate panel surfaces 110, 112 may be separated by a spacer 130. The two separate panels may be fastened together by a fastener, such as screws, nails, adhesives, nuts and bolts, and the like. In the two-panel piece embodiment, the spacers 130 may be generally rectangular or square in shape and be sandwiched in between the two panel surfaces 110, 112 at their four corners 114, 116, 118, 120. Having the spacers 130 only located at the corners 114, 116, 118, 120 of the panels creates slots at the sides (side slots 180) at the middle portion of the block panel 10. The spacers 130 are arranged so that two adjacent sides 132, 134 of the spacer 130 are flush with two adjacent sides of the block panel (e.g., sides 108, 104). In some embodiments, each spacer 130 may have one, preferably two, protruding stops 136, 138 projecting perpendicularly from each other from an interior corner 140 of the spacer 130 located closest to the center C. By way of example only, two spacers 130, 130' may be positioned at adjacent corners. One stop 138, 136' from each spacer project towards each other, thereby creating a narrowing of the respective side slot 180 for reasons discussed below. The other stops 136, 138' project towards the other adjacent spacers to create the same effect. The discussion below applies equally to two-panel piece embodiments and the one-piece integrally formed embodiment.

The surface slots 150 are created through the first and/or second panel surfaces 110, 112 by creating a cutout within the panel surfaces 110, 112. Therefore, the surface slots 150 are defined by an inner wall 152 created by the cutout. In the preferred embodiment, the inner wall 152 has an elongated shape defined by a first longitudinal wall 154, a second longitudinal wall 156 opposite and parallel to the first longitudinal wall 154, a first transverse wall 158 adjacent to the first and second longitudinal walls 154, 156, and a second transverse wall 160 opposite the first transverse wall 158 and adjacent to the first and second longitudinal walls 154, 156. The transverse distance between the first and second longitudinal walls 154, 156 (e.g. the length of the first and second transverse walls 158, 160) define a surface slot width W1, and the longitudinal distance between the first and second transverse walls 158, 160 (e.g. the length of the first and second longitudinal walls 154, 156) define a surface slot length L1. A surface slot depth D1 is defined as the distance measured from one surface 110 towards the opposite surface 112.

Each surface slot 150 defines a longitudinal axis A1 that bisects the surface slot 150 and is parallel to the first and second longitudinal walls 154, 156, and is parallel to at least one of the first, second, third, or fourth panel sides 102, 104, 106, 108. Each surface slot 150 also defines a surface slot plane P1 through the longitudinal axis A1 and parallel to the first and second longitudinal walls 154, 156. In the preferred embodiment, the block panel 10 comprises four main surface slots 150*a-d* with one slot being adjacent and parallel to one of the panel sides of the block panel 102, 104, 106, 108. In some embodiments, the block panel 10 may comprise auxiliary slots 170. Characteristically, the auxiliary slots 170 are substantially the same as the surface slots 150. The auxiliary slots 170, however, are positioned differently. There may be a single auxiliary slot 170 at or about the middle of the block panel 10. Alternatively, a pair of auxiliary slots 170*a*, 170*b* may be bilaterally arranged about the middle C but interior to the surface slots 150. In other words, the auxiliary slot 170 may be positioned in between two opposing surface slots 150*a*, 150*c*. In some embodiments, the auxiliary slots 170 create a grid network to receiving various arrangements of auxiliary panels 40 to cover up unused slots to create a more aesthetic appearance.

At least one side slot 180 may be on at least one of the first, second, third, or fourth sides 102, 104, 106, 108. In the preferred embodiment, each side has one side slot 180. The side slot 180 is defined by a second inner wall 182, the second inner wall 182 being defined by a third longitudinal wall 184, a fourth longitudinal wall 186 opposite and parallel to the third longitudinal wall 184, a third transverse wall 188 adjacent to the third and fourth longitudinal walls 184, 186, and a fourth transverse wall 190 opposite the third transverse wall 188 and adjacent to the third and fourth longitudinal walls 184, 186. The distance between the third and fourth longitudinal wall 184, 186 (e.g., the length of the third and fourth transverse wall 188, 190) define a side slot width W2, and the distance between the third and fourth transverse walls 188, 190 (e.g., the length of the third and fourth longitudinal walls 184, 186) define a side slot length L2, wherein the surface slot length L1 is approximately equal to the side slot length L2 and the surface slot width W1 is approximately equal to the side slot width W2. A side slot depth D2 is defined as a distance measured from one side towards the opposite side.

The side slot 180 defines a second longitudinal axis A2 parallel to the third and fourth longitudinal walls 184, 186 and bisecting the at least one side slot 180, the second longitudinal axis A2 being parallel to its respective panel side. The side slot 180 defines a second plane P2 through the second longitudinal axis A2 and parallel to the third and fourth longitudinal walls 184, 186, and perpendicular to the first plane P1 of its respective (i.e. nearest) surface slot 150.

As shown in FIG. 3, the cartridge 30 is configured to be partially insertable into a surface slot 150 or a side slot 180. In the preferred embodiment, the surface slots 150 and the side slots 180 have the same dimensions; therefore, the same cartridge 30 is configured to fit into a surface slot 150 or a side slot 180. This allows the block panels 10 and cartridges 30 to have a standard uniform size for easy replication for manufacturing.

Figure 4A:
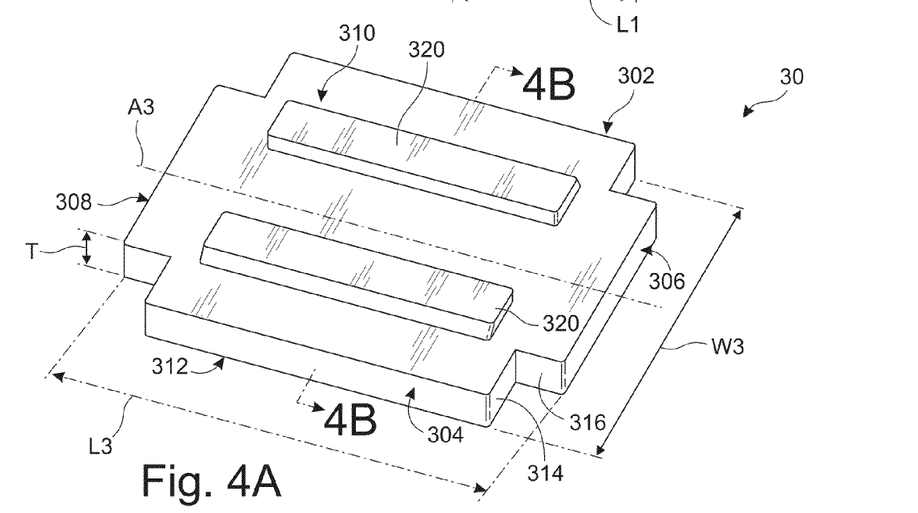
FIG. 4A shows a perspective view of an embodiment of a cartridge.

Since the slots 150, 180 are generally rectangular in shape, the cartridge 30 is also generally rectangular shape. Therefore, the cartridge 30 comprises a first cartridge side 302, a second cartridge side 304 opposite the first cartridge side 302, a third cartridge side 306 adjacent to the first cartridge side 302 and the second cartridge side 304, a fourth cartridge side 308 opposite the third cartridge side 306 and adjacent to the first cartridge side 302 and the second cartridge side 304. The distance between the first cartridge side 302 and the second cartridge side 304 defines a cartridge width W3. The distance between the third cartridge side 306 and the fourth cartridge side 308 defines a cartridge length L3. The cartridge 30 further comprises a first cartridge surface 310 bound by the first, second, third, and fourth cartridge sides 302, 304, 306, 308, and a second cartridge surface 312 opposite the first cartridge surface 310, the second cartridge surface 312 bound by the first, second, third, and fourth cartridge sides 302, 304, 306, 308. The distance between the first and second cartridge surfaces 310, 312 defines a cartridge thickness T. Since the cartridge 30 is configured to fit inside a slot (side slot 180 or a surface slot 150), the cartridge length L3 and the cartridge thickness T are substantially equal to or slightly smaller than the slot length L1, L2 and widths W1, W2, respectively.

In some embodiments, the cartridges 30 may have corner cutouts, thereby creating recessed ledges 314, 316 at the corners. These recessed ledges 314, 316 may abut against, for example, the stops 138, 136' of the spacers 130, 130' to prevent the cartridge 30 from being inserted too deep into a slot.

In the preferred embodiment, the cartridge 30 further comprises a detent 320 protruding from the first or second cartridge surface 310, 312 and/or from one or more of the cartridge sides 302, 304, 306, 308. The detents 320 serve to keep the cartridges secured in the slots 150, 180. Therefore, the cartridge 30 may have a plurality of detents 320. In some embodiments, detents 320 may protrude from the first and/or second cartridge surfaces 310, 312. In some embodiments, multiple detents 320 may protrude from opposite cartridge sides 306, 308.

Figure 4B:
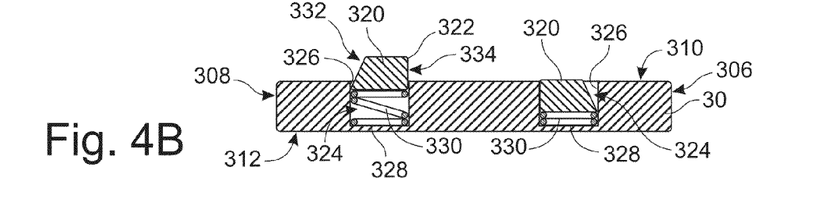
FIG. 4B shows a cross-sectional view of the embodiment shown in FIG. 4A through lines 4B-4B with one of the detents shown in a depressed state.

As shown in FIG. 4B, the detent 320 has a detent height 322 and resides within a cavity 324 created within the cartridge 30. The cavity 324 may be created on the cartridge 306, 308 side or on the cartridge surface 310 or 312. The cavity 324 is created by cutting out a portion of the cartridge 30 leaving a cavity wall 326 and, optionally, a cavity floor 328. The cavity depth is defined by the distance from the cavity floor 328 to the outer surface of the cartridge (either the cartridge surface 310 or 312 or the cartridge side 306, 308 depending on where the cavity was created). If the cavity 324 does not have a cavity floor, then the cavity depth is defined by the distance from one outer surface to the opposite surface (e.g. surface 310 to surface 312). The cavity depth 324 is substantially equal to or greater than the detent height 322.

In the preferred embodiment, the detent 320 is spring-loaded. By spring-loaded, it is meant that the detent 320 is either operatively connected to a spring or is itself a spring. In one embodiment, a compression spring 330 may be positioned in between the cavity floor 328 and the detent 320. The compression spring 330 creates a biasing force against the detent 320 to push the detent 320 partially out of the cavity 324. The detent 320 may have a catch that abuts against either a portion of the cavity wall 326 or a stop embedded in the wall to prevent the detent 320 from being pushed completely out of the cavity 324 by the compression spring 330. In some embodiments, the compression spring 330 may be fastened to the detent 320 and to the cavity floor 328. Since the cavity depth is substantially equal to or greater than the detent height and since the detent 320 is protruding partially out of the cavity 324, a space is created between the detent 320 and the cavity floor 328. Therefore, the detent 320 can be pushed further into the cavity 324 to occupy the space thereby causing the detent 320 to be fully housed within the cavity 324 so as not to protrude from the surface or side from which it was protruding. In embodiments without a cavity floor 324, a stop may be secured to the cavity wall serving as a makeshift floor upon which the spring 330 can be abutted against.

With the detents 320 protruding from the cartridge 30, when the cartridge 30 is inserted into the surface slot 150 or side slot 180, eventually the detents 320 abut the walls 152, 182 defining the slots 150, 180. However, due to the configuration described above, the detents 320 can be temporarily pushed into their respective cavities 324 so as to be flush with the surface or side of the surface slot or side slot as shown in FIG. 4B, respectively, thereby allowing the cartridge 30 to be inserted further into the surface slot 150 or side slot 180.

To facilitate automatic movement of the detent 320 into the cavity when shoved into a slot 150, 180, the detent 320 may have a ramped surface 332. Preferably, the ramped surface 332 is only on the side (outwardly facing side) that makes initial contact with the inner walls 152, 182 defining the slots 150, 180. In other words, the part of the detent 320 facing outwardly towards one of the cartridge sides 302, 304 may be ramped so that when that cartridge side 302, 304 is inserted into the slot 150, 180, the ramped surface 332 portion of the detent 320 makes contact with the slot wall 152, 182. Because the detent surface is ramped, the inner wall 152, 182 defining the slot 150, 180 slides along the ramped surface 332. Because of the inner wall 152, 182 is fixed and the detent 320 is moveable, the detent 320 automatically starts moving into the cavity 324 until the top surface of the detent is flush with the cartridge surface (e.g. surface 310).

As the cartridge 30 moves through the slot 150 or 180 towards the center C of the block panel 10, eventually, the inner wall 152 or 182 will come to a void (e.g., the slot 180 or 150, respectively). This void is configured to receive the detent 320, thereby, allowing the detent 320 to spring back into its protruding position. In some embodiments, the detent 320 may have a flat surface 334 on the side opposite the ramped surface 332. The void may also have a flat mating surface such that when the detent 320 is in the void in the protruding configuration, the flat surface 334 of the detent 320 is flush against the flat mating surface defining the void, thereby encumbering the cartridge 30 from being pulled out in the reverse direction. In order to remove the cartridge 30 in the reverse direction, the detent 320 must be pushed in while pulling the cartridge 30 is being pulled out in the reverse direction.

In some embodiments, the detent 320 may have a first ramped surface 332 and a second ramped surface on the opposite side. For example, in some embodiments, the detent 322 may by dome shaped so as to have a ramped surface all around. Having these types of ramped surfaces allows the cartridge 30 to be inserted into the slot and removed from the slot simply by pushing and pulling harder on the cartridge 30. For example, in one embodiment, the detent may be a ball-nose spring plunger 320a. In another embodiment, the detent may be a leaf spring 320b.

Figure 6:
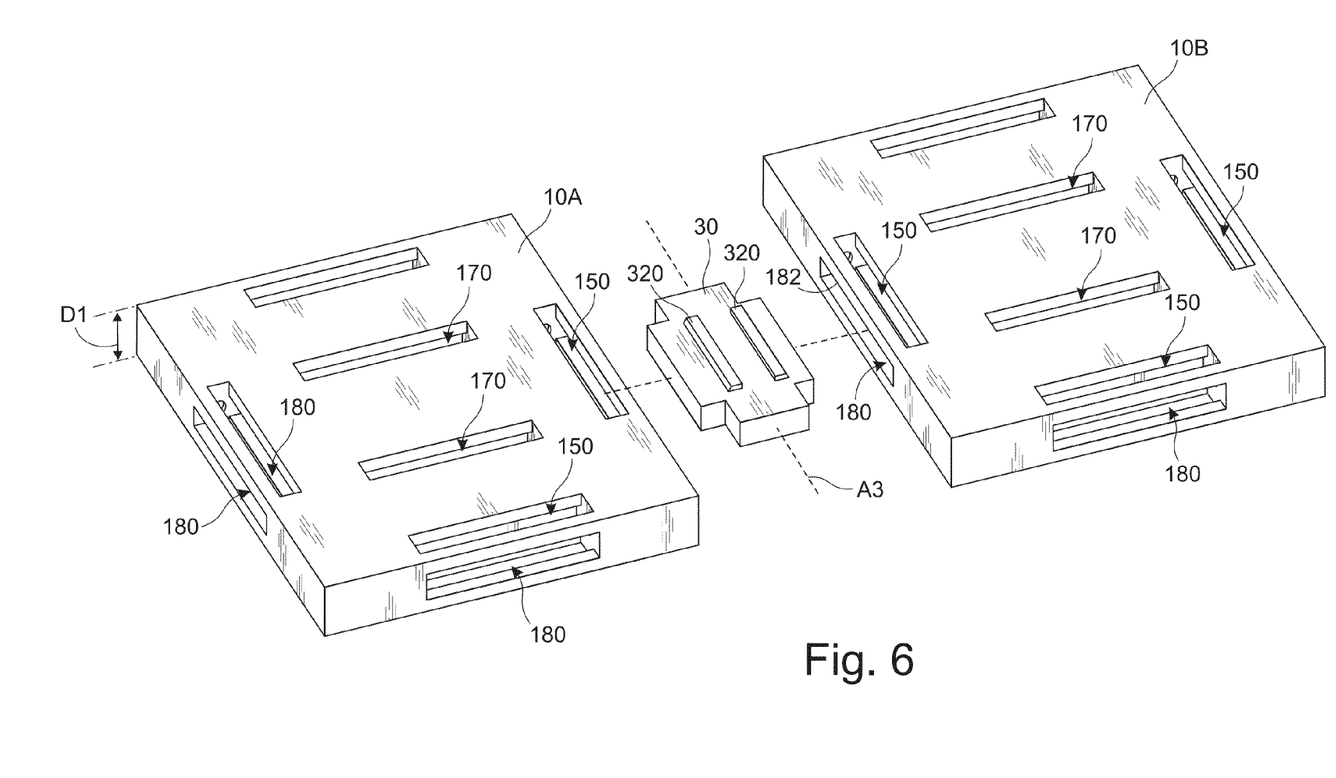
FIG. 6 shows another partial assembly between to block panels.

In the preferred embodiment, the cartridge 30 is symmetrical about its longitudinal axis A3. Therefore, the cartridge 30 may have two detents 320 on its surface bilaterally arranged about the longitudinal axis A3. The cartridges 30 and slots 150, 180 are dimensioned so that when inserted into a slot 150 or 180, the cartridge 30 can only be inserted by about half its width W3. This causes one of the detents 320 to be inside the block panel 10, while the other detent 320 remains exposed. The exposed detent can then be used to connect a first block panel 10A to a second block panel 10B in the same manner. The second block panel 10B can be attached to the first block panel 10A in a parallel arrangement by inserting the cartridge into the side slots 180 of each block panel 10 as shown in FIG. 6. The second block panel 10B can also be attached to the first block panel 10A in a perpendicular arrangement by attaching the cartridge 30 to the first block panel 10A at its surface slot 150, and attaching the exposed end of the cartridge 30 to the second block panel 10B at its side slot 180 as shown in FIG. 5. These kinds of assembly can be repeated in a variety of combinations to create a variety of furniture of varying shapes and sizes.

As mentioned above, in some embodiments, the block panels 10 further comprise at least one auxiliary slot 170 in between the plurality of surface slots 150. Characteristically, the auxiliary slot 170 may be identical or substantially similar to the surface slots 150. Therefore, the auxiliary slot 170 also has a length (an auxiliary slot length) and a width (an auxiliary slot width). In some embodiments, the modular furniture 1 may further comprise an auxiliary panel 40 as shown in FIG. 1. The auxiliary panel 40 comprises a first auxiliary panel surface 402 and a second auxiliary panel surface 404 opposite the first auxiliary panel surface 402, wherein the first auxiliary panel surface 402 comprises an auxiliary cartridge 406 configured or dimensioned to securely fit within the auxiliary slot 170. In other words, the auxiliary cartridge 406 is dimensioned substantially similar to the auxiliary slot 170. Therefore, the relationship of the auxiliary cartridge 406 to the auxiliary slot 170 is analogous to the relationship of the cartridge 30 to the surface slot 150 or side slot 180 of the block panel 10. Accordingly, the auxiliary cartridge 406 has similar characteristics as the cartridge 30, and the auxiliary slot 170 has the same characteristics as the surface slot 150 or side slot 180.

The auxiliary cartridge 406 may be fixed to or integrally formed with the first auxiliary panel surface 402. The second auxiliary panel surface 404 may be a flat opaque surface so as to cover up unsightly portions of the block panel 10. In particular, some of the surface and side slots 150, 180 may not be used for connecting with other block panels 10. In that case the furniture would show a plurality of empty voids. The auxiliary panel 40 can cover these up giving the furniture a nice, smooth appearance. In some embodiments, the second auxiliary panel surface 404 may have a cushion 408. If the furniture is a chair, then this cushion provides a comfortable surface to sit on.

Figure 7:
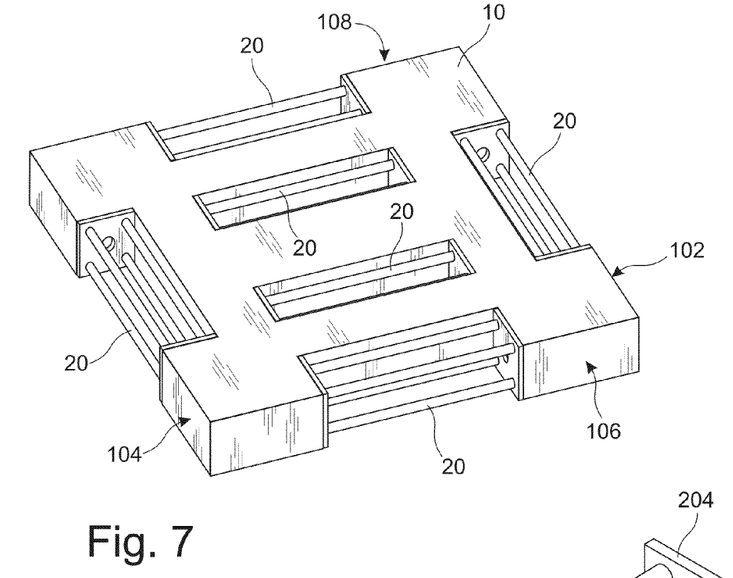
FIG. 7 shows a perspective view of another embodiment of a block panel of the present invention.
Figure 8:
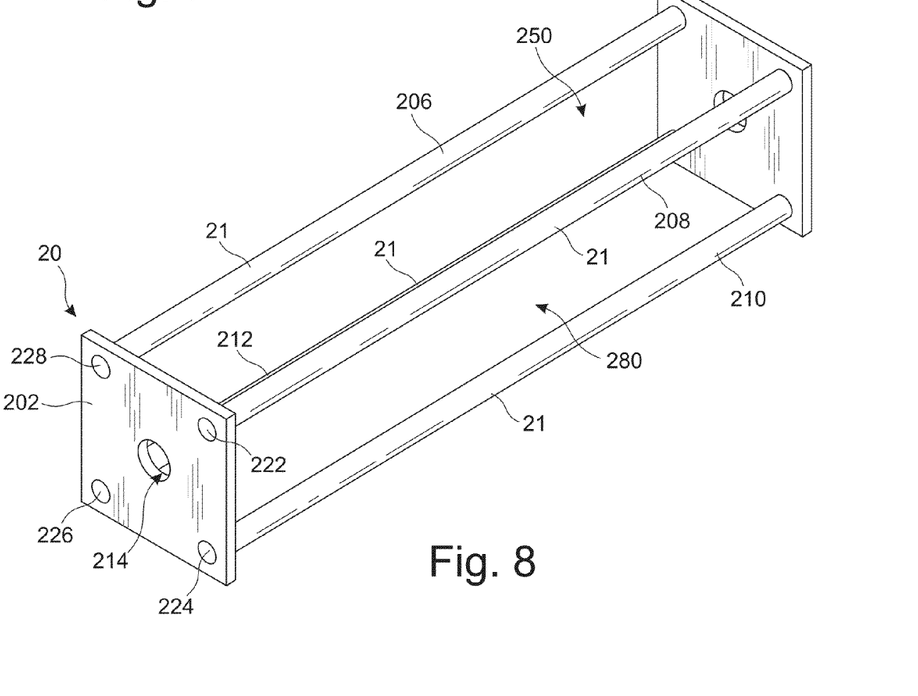
FIG. 8 shows a perspective view of an embodiment of a multi-port receiver.
Figure 9:
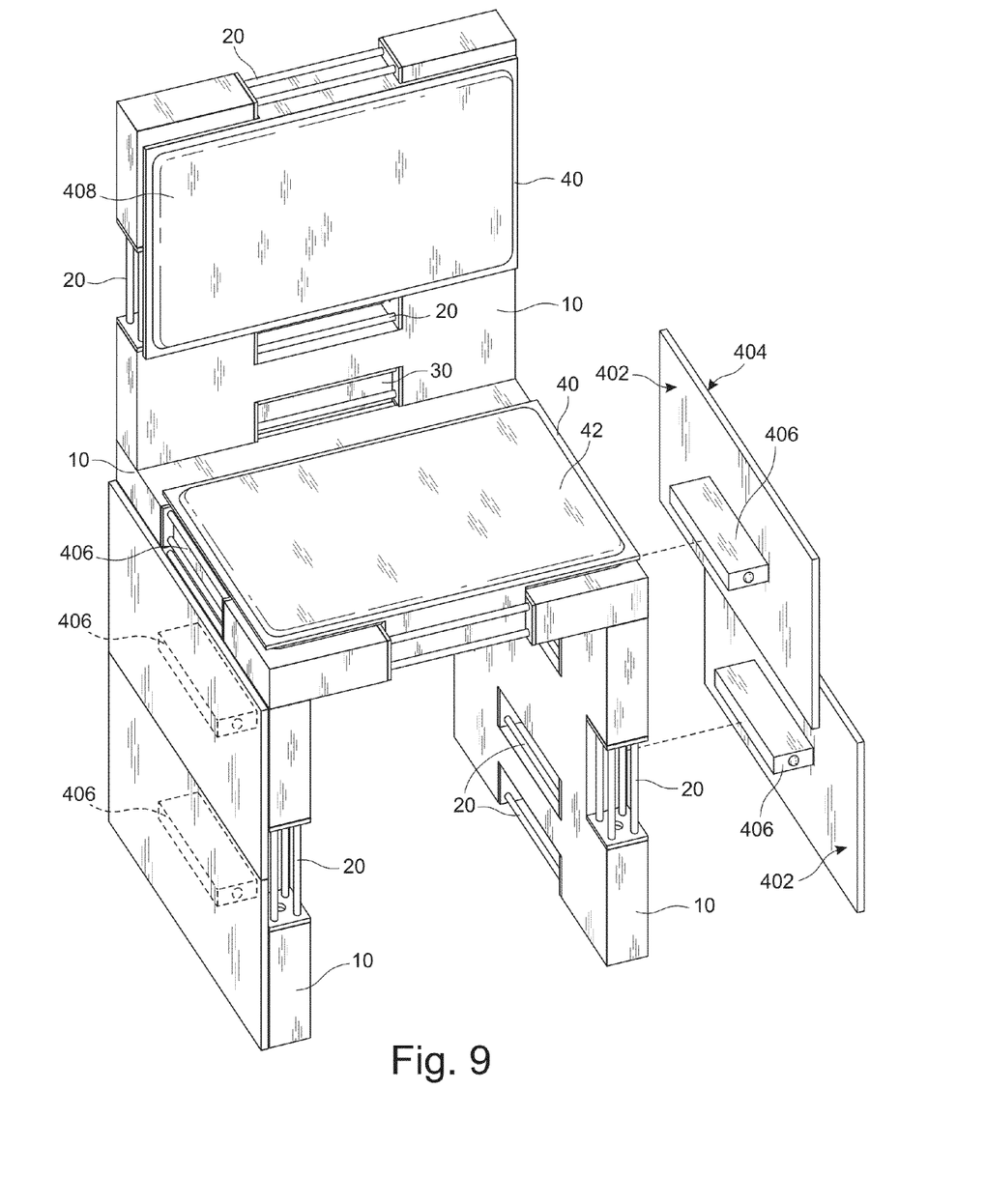
FIG. 9 shows a partially assembled view of another embodiment of the present invention.

In some embodiments, as shown in FIGS. 7-9, the block panel 10 may further comprise a multi-port receiver 20 that can be fixed within a side slot 180 and/or surface slot 150. In some embodiments using the multi-port receiver 20, the side slot 180 may simply be a cutout of the sides 102, 104, 106, 108 that matches the dimensions of the multi-port receiver 20 so the multi-port receiver 20 can fill the cutout space. The multi-port receiver 20 comprises two opposing end plates 202, 204 connected together by four parallel rods 206, 208, 210, 212. In the preferred embodiment, the end plates 202, 204 are rectangular in shape, and more preferably, square in shape. The parallel rods 206, 208, 210, 212 connect the end plates 202, 204 together at their corresponding corners 222, 224, 226, 228 so as to create a box-like shape, as shown in FIG. 8. The gap or space 250, 280 in between adjacent parallel rods 206, 208, 210, 212 is substantially the same dimension as the cartridge thickness T. Therefore, the multi-port receiver 20 essentially serves the same purpose as the side slot 180 or surface slot 150, namely, to receive the cartridges 30 so that multiple block panels 10 can be connected together.

To facilitate the connection with the detent 320 of the cartridge 30, the end plates 202, 204 may comprise a central hole 214. This provides a place for the detents 320 to reside when the cartridge 30 is fully inserted into a multi-port receiver 20 so as to stabilize a cartridge 30 in the multi-port receiver 20. In such an embodiment, the detents may be positioned on the cartridge sides 306, 308 rather than the cartridge surface.

In use, the user will place a cartridge 30 into an side slot 180, a surface slot 150, or a desired multi-port receiver 20 located on the block panel 10. The cartridge 30 is then locked in place when the spring loaded detents 320 pop into the engagement hole 214 on the block panel 10 or a multi-port receiver 20. Once the cartridge 30 is locked in place the user can add on an additional modular block panel 10 to the end of the cartridge 30 that is protruding out from the modular block panel 10. The cartridge 30 is locked in place by, for example, a ball-nose spring plunger. Once both the block panel 10 and cartridge 30 are locked, the user can repeat the process to create the desired structure. This includes but is not limited to: chairs, tables, desks, beds, and couches. When the structure is complete, the user can add auxiliary panels 40 to the exterior. By using auxiliary panels 40 the user can change the visual appearance or texture of their furniture. The user can also add cushion 408 sections as needed. The auxiliary panel 40 is attached to the modular block panels 10 by a cartridge 406 located on the panel 40. When the user would like to create another structure, they will pull both modular block panel 10 and cartridge 30 apart disengaging the detent 320 from the engagement hole 214 and repeat the construction process using a different configuration.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A modular furniture, comprising:
 a. a modular block panel having a generally rectangular configuration and a center, comprising
  i. a first panel side,
  ii. a second panel side opposite the first panel side,
  iii. a third panel side adjacent to the first panel side and the second panel side,
  iv. a fourth panel side opposite the third panel side and adjacent to the first panel side and the second panel side,
  v. a first panel surface bound by the first, second, third, and fourth panel sides, and
  vi. a second panel surface opposite the first panel surface, the second panel surface bound by the first, second, third, and fourth panel sides, and
  vii. a plurality of surface slots, each surface slot created through the first and second panel surfaces adjacent to one of the first, second, third, or fourth panel sides, each surface slot defined by a first inner wall created by a cutout through the first and second panel surfaces, the first inner wall being defined by a first longitudinal wall, a second longitudinal wall opposite and parallel to the first longitudinal wall, a first transverse wall adjacent to the first and second longitudinal walls, and a second transverse wall opposite the first transverse wall and adjacent to the first and second longitudinal walls, a transverse distance between the first and second longitudinal walls defining a first slot width, and a longitudinal distance between the first and second transverse walls defining a first slot length, each surface slot defining 1, a first longitudinal axis parallel to the first and second longitudinal walls and bisecting the surface slot, the longitudinal axis being parallel its respective panel side, and
2. a first plane through the first longitudinal axis and parallel to the first and second longitudinal walls, viii. at least one side slot on at least one of the first, second, third, or fourth sides, wherein the at least one side slot is defined by a second inner wall, the second inner wall defined by a third longitudinal wall, a fourth longitudinal wall opposite and parallel to the third longitudinal wall, a third transverse wall adjacent to the third and fourth longitudinal walls, and a fourth transverse wall opposite the third transverse wall and adjacent to the third and fourth longitudinal walls, the third and fourth longitudinal wall defining a second slot length, and the third and fourth transverse wall defining a second slot width, wherein the first slot length is approximately equal to the second slot length and the first slot width is approximately equal to the second slot width, the at least one side slot defining:
1. a second longitudinal axis parallel to the third and fourth longitudinal walls and bisecting the at least one side slot, the second longitudinal axis being parallel to at least one of the first, second, third, or fourth sides, and
2. a second plane through the second longitudinal axis and parallel to the third and fourth longitudinal walls, and perpendicular to the first plane;

b. a cartridge configured to be partially inserted into one of the plurality of surface slots or the at least one side slot, the cartridge comprising:
i. a first cartridge side,
ii. a second cartridge side opposite the first cartridge side,
iii. a third cartridge side adjacent to the first cartridge side and the second cartridge side,
iv. a fourth side opposite the third cartridge side and adjacent to the first cartridge side and the second cartridge side,
v. a first cartridge surface bound by the first, second, third, and fourth cartridge sides, and
vi. a second cartridge surface opposite the first cartridge surface, the second cartridge surface bound by the first, second, third, and fourth cartridge sides, the first and second cartridge surfaces defining a cartridge thickness, and
vii. a detent having a detent height, the detent protruding away from the cartridge, wherein the cartridge thickness is substantially equal to the first and second slot widths.

2. The modular furniture of claim 1, further comprising at least one auxiliary slot in between the plurality of surface slots, the auxiliary slot having an auxiliary slot length and an auxiliary slot width.

3. The modular furniture of claim 2, further comprising an auxiliary panel, the auxiliary panel comprising a first auxiliary panel surface and a second auxiliary panel surface opposite the first auxiliary panel surface, wherein the first auxiliary panel surface comprises an auxiliary cartridge configured to securely fit within the auxiliary slot.

4. The modular furniture of claim 3, wherein the second auxiliary panel surface comprises a cushion.

5. The modular furniture of claim 1, further comprising a spacer positioned in between the first and second panel surfaces to create a gap in between the first and second panel surfaces.

6. The modular furniture of claim 1, wherein the detent is spring-loaded, and wherein the first cartridge surface comprises a cavity having a cavity depth that is substantially equal to or greater than the detent height.

7. The modular furniture of claim 1, wherein the detent comprises a ramped surface.

8. A modular furniture, comprising;
a. a modular block panel, comprising a first panel side, a second panel side opposite the first panel side, a third panel side adjacent to the first panel side and the second panel side, a fourth panel side opposite the third panel side and adjacent to the first panel side and the second panel side, a first panel surface bound by the first, second, third, and fourth panel sides, and a second panel surface opposite the first panel surface, the second panel surface bound by the first, second, third, and fourth panel sides, and a plurality of surface slots on the first or second panel surfaces and a plurality of side slots on the first panel side, the second panel side, the third, panel side, or the fourth panel side, wherein at least one side slot is perpendicular to and intersects at least one surface slot;
b. a plurality of cartridges, each cartridge configured for insertion into at least one of the plurality of surface slots or side slots.

9. The modular furniture of claim 8, further comprising a plurality of multi-port receivers configured to fit within the plurality of surface slots or the plurality of side slots.

10. The modular furniture of claim 9, wherein the multi-port receiver comprises:
a. a pair of opposing endplates having a rectangular configurations with four corners; and
b. four rods, each rod attached to opposing corners of the pair of endplates to form a box-like configuration.

11. The modular furniture of claim 8, further comprising:
a. at least one auxiliary slot in between the plurality of surface slots; and
b. an auxiliary panel, the auxiliary panel comprising a first auxiliary panel surface and a second auxiliary panel surface opposite the first auxiliary panel surface, wherein the first auxiliary panel surface comprises an auxiliary cartridge configured to securely fit within the auxiliary slot.

12. The modular furniture of claim 11, wherein the second auxiliary panel surface comprises a cushion.

13. The modular furniture of claim 8, wherein the cartridge comprises a detent having a detent height.

14. The modular furniture of claim 13, wherein the detent is spring-loaded, and wherein the first cartridge surface comprises a cavity having a cavity depth that is substantially equal to or greater than the detent height.

15. The modular furniture of claim 13, wherein the detent comprises a ramped surface.

16. A method of constructing a modular furniture, comprising:
a. providing a plurality of block panels, each block panel comprising a plurality of slots, the plurality of slots comprising surface slots and side slots, wherein at least one side slot is perpendicular to and intersects at least one surface slot;
b. providing a plurality of cartridges, each cartridge configured for insertion into at least one of the plurality of slots;

c. partially inserting a first cartridge into a first slot of a first block panel, thereby leaving an exposed cartridge portion;
d. inserting the exposed cartridge portion into a first slot of a second block panel;
e. partially inserting a second cartridge into a second slot of the first block panel so as to leave a second exposed cartridge portion;
f. inserting the second exposed cartridge portion into a first slot of a third block panel; and
g. repeating steps e and f with subsequent panels and cartridges until a desired modular furniture is constructed.

17. The method of claim 16, wherein the cartridges comprise a plurality of spring-loaded detents to secure the cartridges within the slots.

18. The method of claim 16, further comprising attaching an auxiliary panel to at least one of the first, second, or third block panels.

19. The method of claim 16, further comprising providing a plurality of multi-port receivers, and fastening one multi-port receiver to each slot, wherein the plurality of cartridges are connected to their respective slots via one of the multi-port receivers.

\* \* \* \* \*